(12) United States Patent
Yang et al.

(10) Patent No.: US 11,156,840 B2
(45) Date of Patent: Oct. 26, 2021

(54) OPTICAL GUIDE AND OPTICAL SYSTEM

(71) Applicants: UNIVERSITE DE STRASBOURG, Strasbourg (FR); CENTRE NATIONAL DE LA RECHERCHE SCIENTIFIQUE (CNRS), Paris (FR); INSTITUT NATIONAL DES SCIENES APPLIQUEES, Strasbourg (FR)

(72) Inventors: Jianming Yang, Illkirch Graffenstaden (FR); Patrice Twardowski, Strasbourg (FR); Joël Fontaine, Strasbourg (FR)

(73) Assignees: UNIVERSITE DE STRASBOURG, Strasbourg (FR); CENTRE NATIONAL DE LA RECHERCHE SCIENTIFIQUE (CNRS), Paris (FR); INSTITUT NATIONAL DES SCIENES APPLIQUEES, Strasbourg (FR)

( * ) Notice: Subject to any disclaimer, the term of this patent is extended or adjusted under 35 U.S.C. 154(b) by 0 days.

(21) Appl. No.: 16/902,843

(22) Filed: Jun. 16, 2020

(65) Prior Publication Data

US 2020/0310136 A1   Oct. 1, 2020

Related U.S. Application Data

(63) Continuation of application No. 16/069,256, filed as application No. PCT/FR2017/050073 on Jan. 12, 2017, now Pat. No. 10,718,946.

(30) Foreign Application Priority Data

Jan. 15, 2016 (FR) ......................................... 1650351
Nov. 15, 2016 (FR) ......................................... 1661067

(51) Int. Cl.
*G02B 6/00* (2006.01)
*G02B 27/01* (2006.01)
(Continued)

(52) U.S. Cl.
CPC ....... *G02B 27/0172* (2013.01); *G02B 6/0031* (2013.01); *G02B 6/0066* (2013.01);
(Continued)

(58) Field of Classification Search
CPC ... G02B 1/00; G02B 3/00; G02B 3/08; G02B 5/00; G02B 5/10; G02B 5/18; G02B 6/00;
(Continued)

(56) References Cited

U.S. PATENT DOCUMENTS 4,761,056 A   8/1988  Evans et al.
5,886,822 A   3/1999  Spitzer et al.
(Continued)

FOREIGN PATENT DOCUMENTS

FR   2941786 A1   8/2010
FR   2983976 B1   10/2017

OTHER PUBLICATIONS

Shenk, Calculus and Analytic Geometry, Second Edition published by Goodyear Publishing Company, Inc. in 1979, at p. 573 (Year: 1979).*
(Continued)

*Primary Examiner* — Michael J Eurice
(74) *Attorney, Agent, or Firm* — Marshall, Gerstein & Borun LLP

(57) ABSTRACT

An optical guide for a near-eye display device includes a first guide element having a light input zone and a second guide element having an output zone. The first guide element is superimposed on the second guide element. The optical guide also includes an optical coupling system
(Continued)

between the first guide element and the second guide element, and the first and second guide elements have, on the first part of their length, a mutual spacing so as to delimit a thin layer of air between said guide elements extending between a first longitudinal end of the guide elements and the optical coupling system. The optical coupling system, located at a second longitudinal end of the first and second guide elements, includes a single-piece portion of the guide elements, associated with an optical reflection member to propagate the beams of light from the input zone toward the output zone.

14 Claims, 9 Drawing Sheets

(51) Int. Cl.
  *F21V 8/00* (2006.01)
  *G02B 27/09* (2006.01)
(52) U.S. Cl.
  CPC ..... *G02B 27/0955* (2013.01); *G02B 27/0977* (2013.01); *G02B 6/0076* (2013.01); *G02B 2027/015* (2013.01); *G02B 2027/0118* (2013.01); *G02B 2027/0123* (2013.01); *G02B 2027/0125* (2013.01); *G02B 2027/0152* (2013.01)
(58) Field of Classification Search
  CPC .... G02B 6/0018; G02B 6/002; G02B 6/0031; G02B 6/0033; G02B 6/0035; G02B 6/34; G02B 6/352; G02B 6/4204; G02B 6/4214; G02B 6/005; G02B 6/0076; G02B 13/00; G02B 17/00; G02B 27/01; G02B 27/0101; G02B 27/126; G02B 27/145; G02B 27/017; G02B 27/0172
  See application file for complete search history.

(56) References Cited

U.S. PATENT DOCUMENTS

| | | | |
|---|---|---|---|
| 5,913,594 | A | 6/1999 | Iimura et al. |
| 5,986,790 | A | 11/1999 | Ota et al. |
| 5,987,046 | A | 11/1999 | Kobayashi et al. |
| 10,175,489 | B1 | 1/2019 | Robbins et al. |
| 2001/0010598 | A1 | 8/2001 | Aritake |
| 2002/0176664 | A1 | 11/2002 | Guida |
| 2004/0042233 | A1 | 3/2004 | Suzuki et al. |
| 2004/0085649 | A1 | 5/2004 | Repetto |
| 2004/0264846 | A1 | 12/2004 | Nakata et al. |
| 2005/0180687 | A1 | 8/2005 | Amitai |
| 2006/0187528 | A1 | 8/2006 | Hagood et al. |
| 2007/0153395 | A1 | 7/2007 | Repetto et al. |
| 2007/0285793 | A1 | 12/2007 | Liu et al. |
| 2008/0240659 | A1 | 10/2008 | Kopp |
| 2009/0147535 | A1 | 6/2009 | Mienko et al. |
| 2009/0245730 | A1 | 10/2009 | Kleemann et al. |
| 2010/0157433 | A1 | 6/2010 | Mukawa et al. |
| 2010/0180476 | A1 | 7/2010 | Welch et al. |
| 2010/0202048 | A1 | 8/2010 | Amitai et al. |
| 2010/0232172 | A1 | 9/2010 | de Lamberterie et al. |
| 2010/0321409 | A1 | 12/2010 | Komori et al. |
| 2011/0001901 | A1 | 1/2011 | Solomon et al. |
| 2011/0175799 | A1 | 7/2011 | Yamada et al. |
| 2012/0206674 | A1 | 8/2012 | Weber et al. |
| 2012/0212400 | A1 | 8/2012 | Border et al. |
| 2012/0262288 | A1 | 10/2012 | Moussa et al. |
| 2013/0063968 | A1* | 3/2013 | Neugebauer ......... G02B 6/0043 362/603 |
| 2013/0070338 | A1 | 3/2013 | Gupta et al. |
| 2013/0215516 | A1 | 8/2013 | Dobschal et al. |
| 2013/0300766 | A1 | 11/2013 | Mukawa |
| 2013/0308339 | A1 | 11/2013 | Woodgate et al. |
| 2014/0140653 | A1 | 5/2014 | Brown et al. |
| 2014/0268867 | A1 | 9/2014 | Fiorentino et al. |
| 2014/0340286 | A1 | 11/2014 | Machida et al. |
| 2015/0226970 | A1 | 8/2015 | Mukawa |
| 2015/0229897 | A1 | 8/2015 | Mukawa |
| 2015/0260995 | A1 | 9/2015 | Mukawa |
| 2015/0277125 | A1 | 10/2015 | Hirano et al. |
| 2015/0277126 | A1 | 10/2015 | Hirano et al. |
| 2015/0288148 | A1 | 10/2015 | Takabayashi |
| 2015/0370075 | A1 | 12/2015 | Ato et al. |
| 2016/0018582 | A1 | 1/2016 | Fiorentino et al. |
| 2016/0033705 | A1 | 2/2016 | Fattal et al. |
| 2016/0097931 | A1 | 4/2016 | Takahota et al. |
| 2016/0131813 | A1 | 5/2016 | Hikmet et al. |
| 2016/0139033 | A1 | 5/2016 | Zallat et al. |
| 2016/0154243 | A1 | 6/2016 | Aiki et al. |
| 2018/0011324 | A1 | 1/2018 | Popovich et al. |
| 2018/0024289 | A1 | 1/2018 | Fattal et al. |
| 2018/0046859 | A1 | 2/2018 | Jarvenpaa et al. |
| 2018/0164489 | A1 | 6/2018 | Fattal et al. |
| 2018/0164490 | A1 | 6/2018 | Ma et al. |
| 2018/0188441 | A1 | 7/2018 | Fattal et al. |
| 2018/0239177 | A1 | 8/2018 | Oh et al. |
| 2018/0246330 | A1 | 8/2018 | Fattal et al. |
| 2018/0275350 | A1* | 9/2018 | Oh .................... G02B 27/0189 |
| 2018/0299678 | A1 | 10/2018 | Singer et al. |
| 2018/0322845 | A1 | 11/2018 | Machida et al. |
| 2019/0033656 | A1 | 1/2019 | Tan et al. |
| 2019/0146221 | A1 | 5/2019 | Oku et al. |
| 2019/0206136 | A1 | 7/2019 | West et al. |
| 2019/0227309 | A1 | 7/2019 | Kadono et al. |
| 2019/0227335 | A1 | 7/2019 | Fattal et al. |

OTHER PUBLICATIONS

International Search Report issued in PCT Patent Application No. PCT/FR2017/050073 dated Jul. 7, 2017.
Yang et al., "Polychromatic see-through near-eye display design with two waveguides and a large field-of-view," *International Society for Optical Engineering*, vol. 9896 (2016).
Yang et al., "Design of a large field-of-view see-through near to eye display with two geometrical waveguides," *Optical Letters*, vol. 41, No. 23 (2016.
Han et al., Portable waveguide display system with a large field of view by integrating freeform elements and volume holograms, *Optics Express*, vol. 23, No. 3 (2015).
Anonymous, "OSA | Early Posting," URL:https://web.archive.org/web/20150812135425/https://www.osapublishing.org/ol/earlyposting/faq.cfm (2015).
Written Opinion issued in PCT Patent Application No. PCT/FR2017/050073 dated Jul. 7, 2017.

* cited by examiner

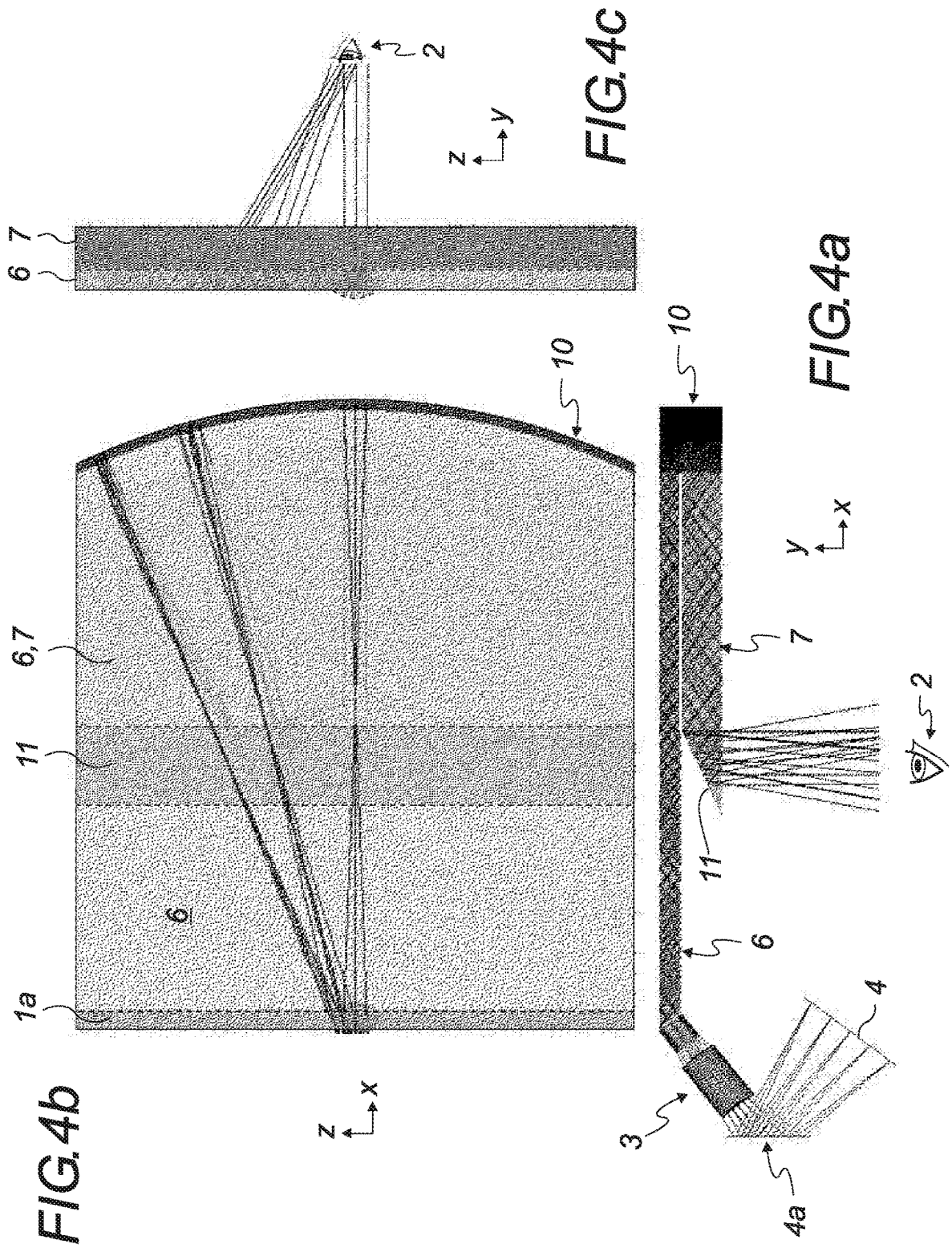

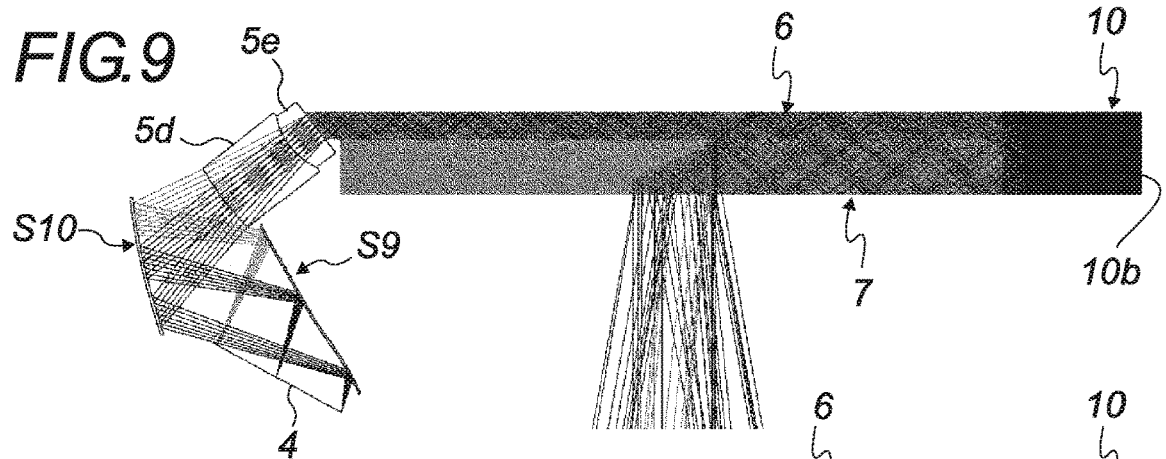
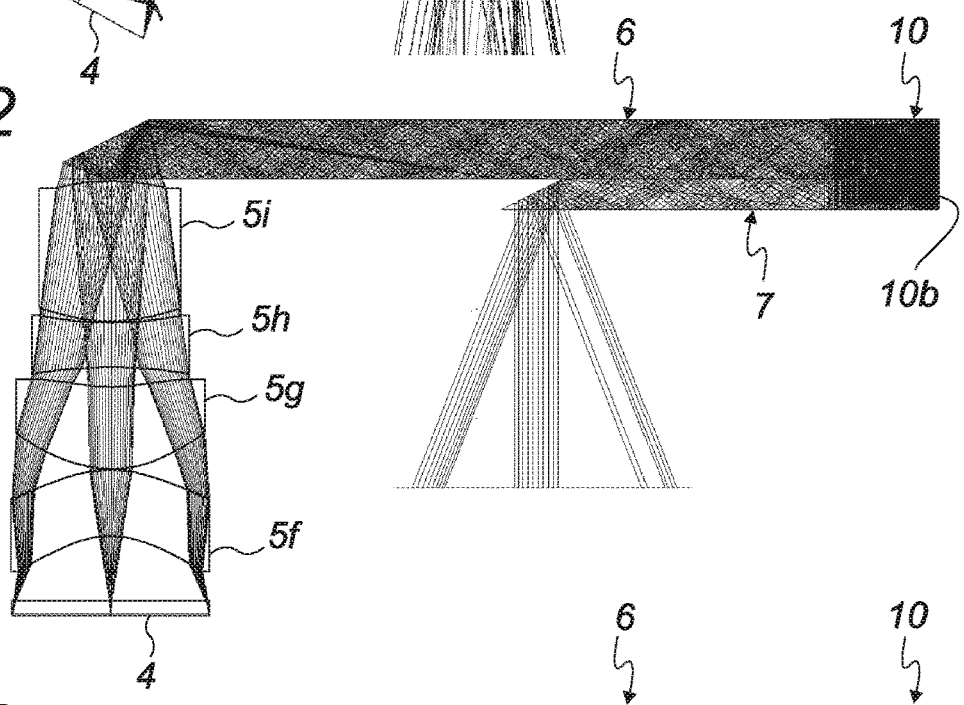
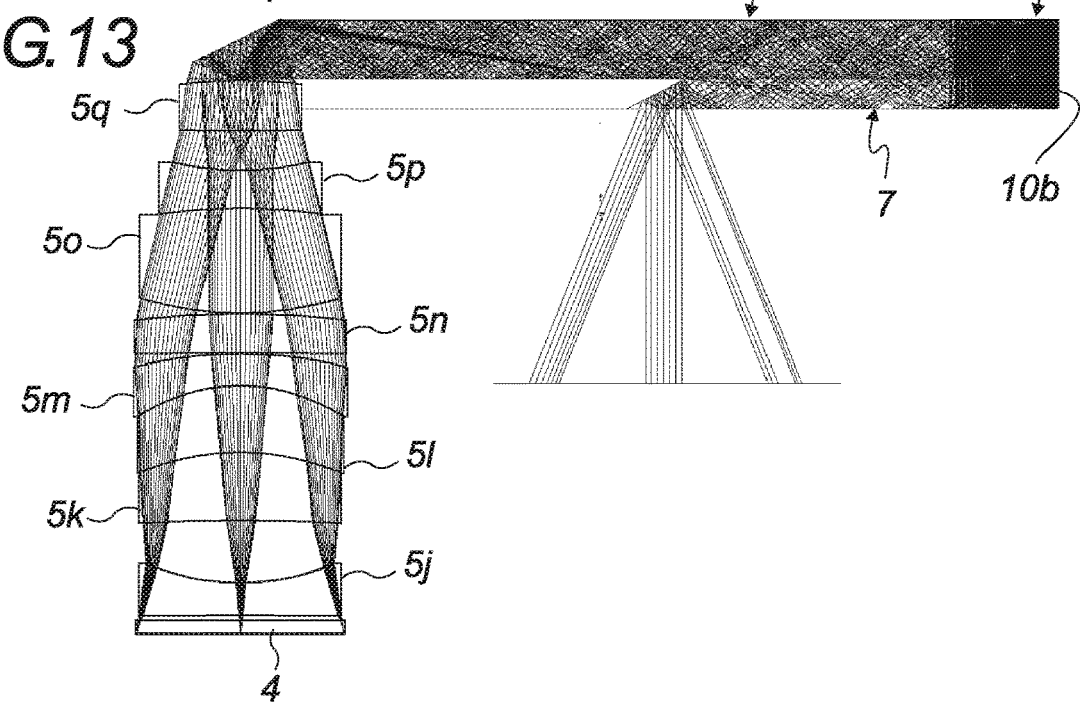

OPTICAL GUIDE AND OPTICAL SYSTEM

TECHNICAL FIELD

The present disclosure relates to the general technical field of optical devices and/or systems used in virtual or augmented reality and, in particular, relates to the medical field, the educational and cultural field, and the gaming field. The disclosure is in particular applicable to navigation, safety, transportation and industrial prototyping systems.

The optical systems according to the disclosure works with all polychromatic or monochromatic light, in the visible domain.

The present disclosure more particularly relates to optical guides used in equipment, accessories or other instruments having a Near-Eye Display (NED), such as helmets or special glasses.

BACKGROUND

The known near-eye display devices, in particular those with propagation of light rays in the open air, have non-negligible drawbacks. Indeed, in these devices, the mirrors used are large, thus contributing to increasing the bulk of said devices. The weight of these devices is also a drawback. Such devices are in particular described in documents US 2012/0212400 A1 or FR 2,941,786 A1.

Document FR 2,983,976 also teaches an optical guide with superimposed guide elements. The lamellar guide elements are contiguous by one of their faces and separated by a semi-reflective coating on at least part of their length. Precise positioning of the semi-reflective coating makes the manufacturing of such optical guides complex and costly. Furthermore, the contiguous assembly of the two guide elements must be free of dimensional irregularities or air pockets to guarantee that the optical guide works perfectly.

It is also difficult to control the losses experienced by the optical signals propagating through such optical guides.

The known optical systems, in particular those including such optical guides, often procure a limited field of view in at least one direction, typically a field of view of 26° (horizontal direction)×20° (vertical direction). This is quite often a major drawback in their fields of use.

SUMMARY OF THE DISCLOSURE

The presently disclosed embodiments therefore aim to offset the drawbacks of the prior art and to provide a new optical guide making it possible to substantially broaden the field of view.

Another aim is to provide a new optical guide that is more compact and lighter.

Another aim is to increase the dimensions of the eyebox. By definition, the zone referred to as the "eyebox" is the movement zone of the user's eye in which an acceptable detection is guaranteed. The dimensions of this zone, called "eyebox", vary depending on the example embodiments.

The aims assigned to the disclosed embodiments are achieved using an optical guide for a near-eye display device comprising:

a first guide element having an input zone to inject a beam of light therein, a second guide element having an output zone to extract the beam of light therefrom, the first guide element being superimposed on said second guide element, and an optical coupling system between the first guide element and the second guide element, characterized in that:

the first and second guide elements have, over a first part of their length, a mutual spacing so as to delimit a fine layer of air between said guide elements extending between a first longitudinal end of the guide elements and the optical coupling system, the optical coupling system, located at a second longitudinal end of the first and second guide elements, comprising a single-piece portion of said guide elements, associated with an optical reflection member for propagating the beams of light from the input zone toward the output zone.

According to one preferred example embodiment of the optical guide, the spacing between the guide elements has a thickness e comprised between 0.1 mm and 0.2 mm.

According to one example embodiment of the optical guide, the first guide element has the input zone at its first free longitudinal end, in the form of an inclined face.

According to one example embodiment of the optical guide, the output zone is provided with a light extraction system including at least one extraction mirror.

According to another preferred example embodiment of the optical guide, the output zone is provided with a light extraction system including a series of several semi-reflective extraction mirrors, making up an extraction guide.

According to one preferred example embodiment of the optical guide, the second guide element has a thickness $e2$ linked to the thickness $e1$ of the first guide element by the relationship: $e2 = e1 \times (\tan \beta / \tan \alpha)$, with $\alpha$ and $\beta$ respectively the minimum and maximum incidences of the beams of light injected into the first guide element.

According to one preferred example embodiment of the optical guide, the first guide element and the second guide element have a length comprised between 40 mm and 50 mm, the width of said guide elements being identical and comprised between 35 mm and 45 mm.

According to one example embodiment, the optical guide has a total thickness $e3$ comprised between 4 mm and 7 mm.

According to one example embodiment of the optical guide, the guide elements are made with the same component material, of the PMMA type.

According to one example embodiment of the optical guide, the optical reflection member is made up of micro-reflectors arranged with a cylindrical profile at the free end of the portion.

According to one preferred example embodiment of the optical guide, the micro-reflectors are in metallized sawtooth form, which are made in the cylindrical free end of the portion.

According to another example embodiment of the optical guide, the optical reflection member is a cylindrical mirror covering the cylindrical end surface of the portion.

The aims of the disclosed embodiments are also achieved using an optical near-eye display system comprising an optical guide described above and a light injection system, to inject the light into said optical guide, the injection system including a micro-display to provide point light sources, said injection system making it possible to obtain, in the guide, beams of light that are parallel in a given direction y and convergent in a plane xz orthogonal to said direction y.

According to one example embodiment of the optical system, the injection system includes optimized members for focusing, in a plane zx, orthogonal to the plane yx, each beam of light on a curved focal surface, which is located substantially at the focal distance from the cylindrical mirror.

According to another example embodiment, the light injection system comprises two lenses having three free-form optical surfaces and a planar mirror.

According to another example embodiment, the light injection system comprises two free-form mirrors and one lens having at least one free-form optical surface and a spherical lens.

According to another example embodiment, the light injection system comprises a one-piece free-form prism having four free-form optical surfaces, two of which work in transmission, while the other two work in reflection, and a lens having a free-form optical surface.

The aims of the disclosed embodiments are also achieved using an optical near-eye display system comprising an optical guide described above and a light injection system, which comprises a micro-display to provide point light sources, three aspherical lenses arranged to have six aspherical optical surfaces and one spherical lens, said injection system makes it possible to obtain, in the guide, parallel beams of light.

According to one example embodiment, the aspherical lenses, having a symmetry of revolution, are made for at least one of them with a component material different from that of the other lenses.

According to another example embodiment, the light injection system, which comprises a micro-display to provide point light sources and eight spherical lenses, makes it possible to obtain, in the guide, parallel beams of light The spherical lenses, having a symmetry of revolution, are advantageously made from optical glasses or a combination of optical glasses and plastics/polymers.

In these last two embodiments, the optical system has the advantage of working with planar waves in the first and second guide elements. The light injection system can therefore have a symmetry of revolution. Furthermore, the injection of planar waves in the optical guide makes it possible to simplify the optical system and reduce its cost.

The optical system is advantageously integrated into a virtual or augmented reality headset.

The optical guide device also has the enormous advantage of being very compact and light. For a compactness similar to that of a known optical guide, the field of view is significantly enhanced.

One remarkable advantage of the optical guide lies in obtaining a broadened field of view. Indeed, the obtained maximal field of view, expressed in the air, is at least 20° and up to 45° in the horizontal direction, at least 40° and up to 60° in the vertical direction, thus substantially and unexpectedly increasing the field of view, in particular in the vertical direction.

The optical system also makes it possible to increase the movement zone of the user's eye and thus to guarantee an acceptable detection. This zone, called "eyebox", varies depending on the example embodiments from 15 mm (H: horizontally)×4 mm (V: vertically), up to 15 mm (H) by 12 mm (V) using a light extraction guide.

BRIEF DESCRIPTION OF THE FIGURES

Other features and advantages will appear upon reading the following description, done in reference to the appended drawings provided as illustrative and non-limiting examples, in which.

DETAILED DESCRIPTION

Figure 1:
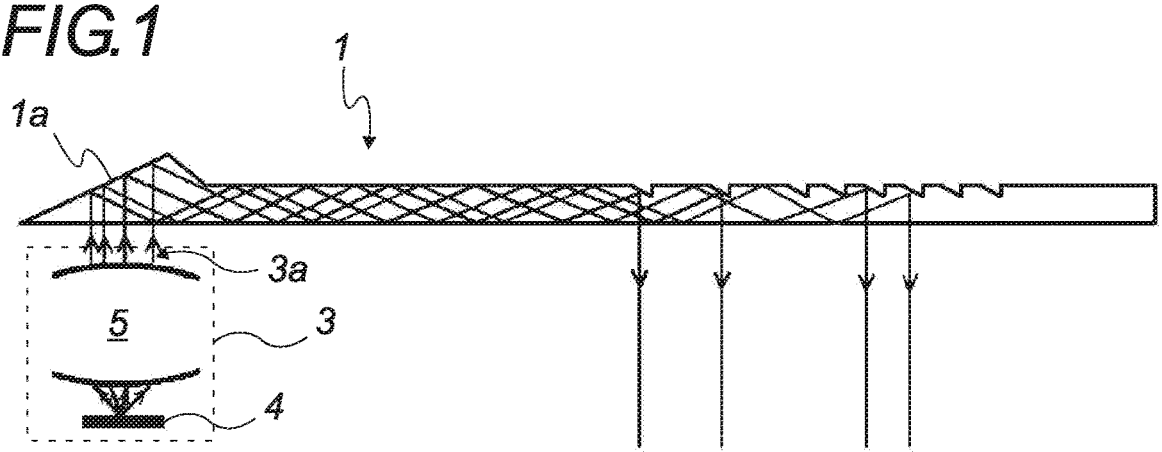
FIG. 1 is a general schematic simplified illustration of a family of known optical guides to which the disclosed embodiments relate, FIGS. 1a and 1b schematically illustrate two example arrangements between an optical guide and a light injection system.

FIG. 1 very schematically illustrates the general principle of the family of optical guides within which an optical guide 1 is developed.

These systems therefore comprise an optical guide 1 transporting a beam of light toward an eye 2 of a user.

The optical system also comprises a light injection system 3, making it possible to inject beams 3a of light into the optical guide 1 via an input zone 1a.

The injection system 3 comprises a micro-display 4 on which point light sources are located generating the beams of light as well as collimating members 5 making it possible to inject several parallel beams 3a of light in the optical guide 1.

Figure 1A:
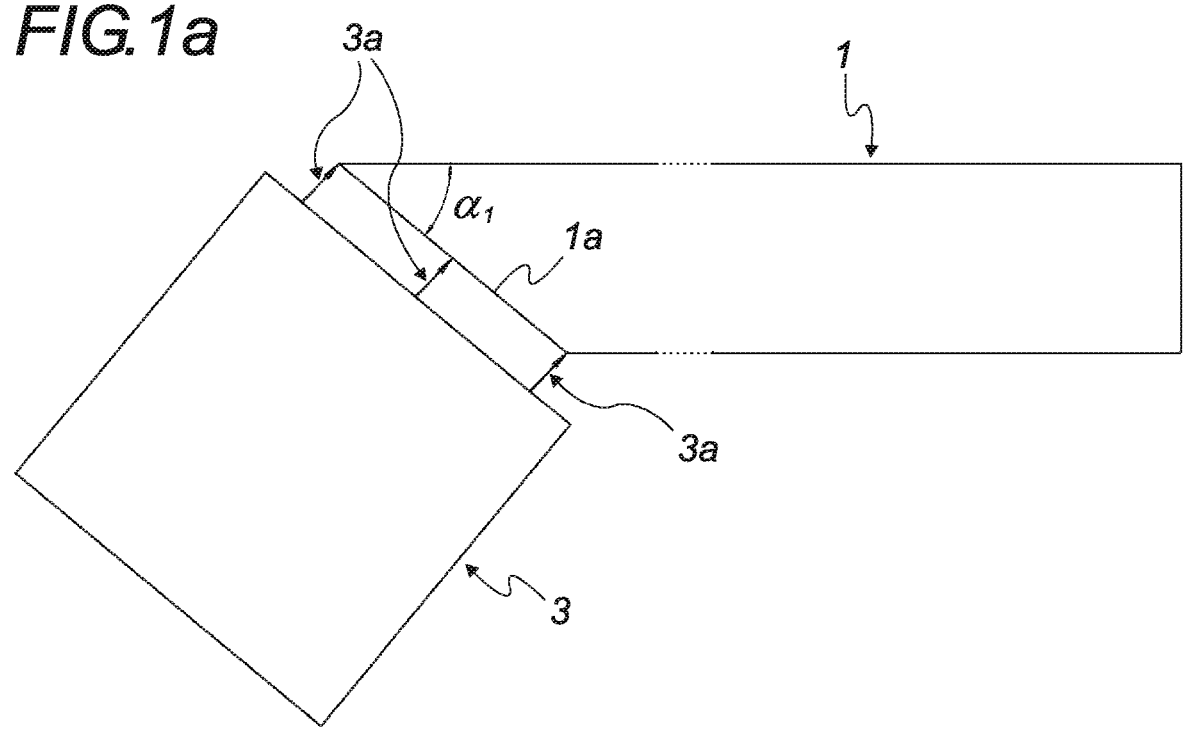

In the example embodiment illustrated in FIG. 1a, the input zone 1a is an inclined zone of the optical guide 1. The injection of light by the injection system 3 is done by choosing an appropriate angle for the incline of this inclined face.

Figure 1B:
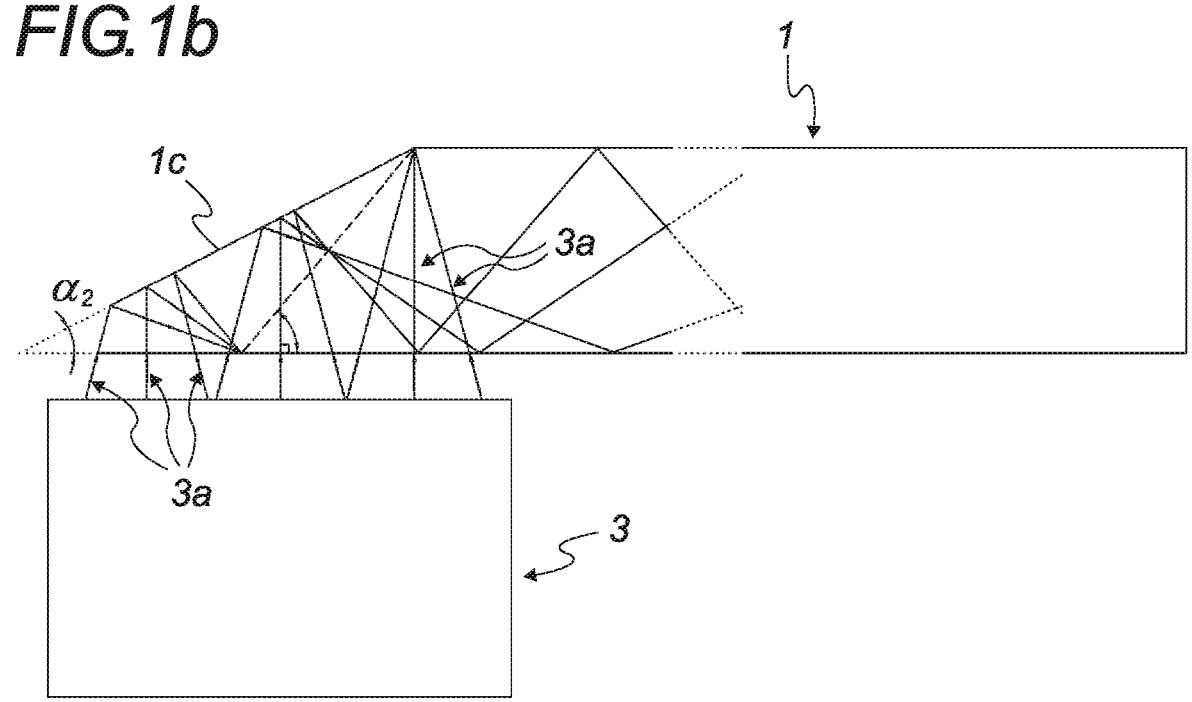

In the example embodiment illustrated in FIG. 1b, the injection system 3 is perpendicular to the longitudinal extension of the optical guide 1. The input coupling in the optical guide is obtained via a coupling mirror 1 made up of the inclined and metallized face of the optical guide 1. As an example, the incline angles α1 and α2 are respectively equal to 45° and 24° for a material of the PMMA type. The beams of light injected into the optical guide 1 propagate by total internal reflection.

The efficiency of the optical coupling is identical for both example embodiments of FIGS. 1a and 1b. Only bulk constraints will lead to the use of one or the other of these technical solutions.

Figure 2A:
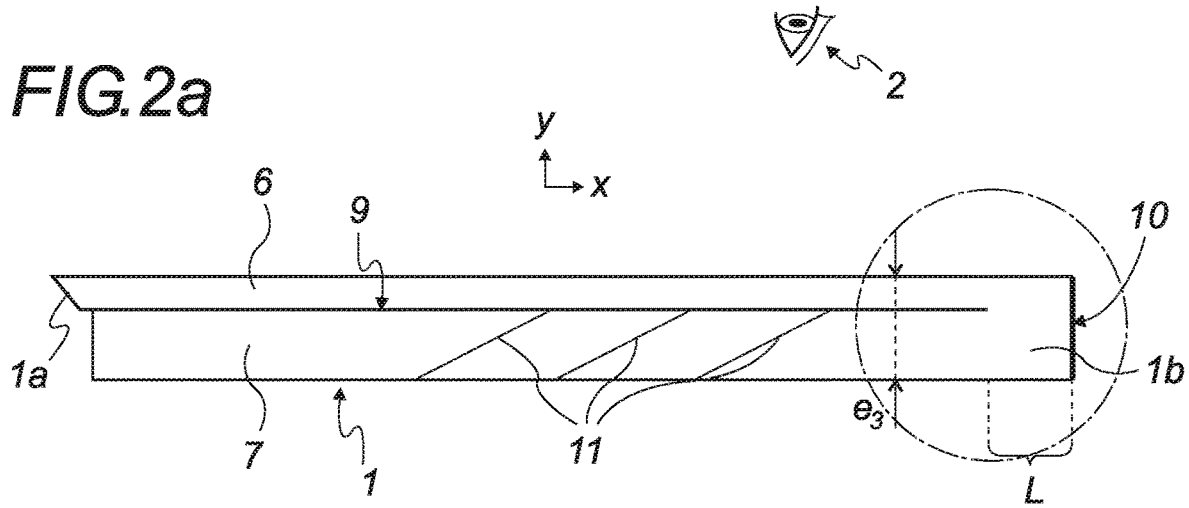
FIG. 2a shows an example embodiment, in longitudinal view, of an example embodiment of an optical guide.
Figure 2B:
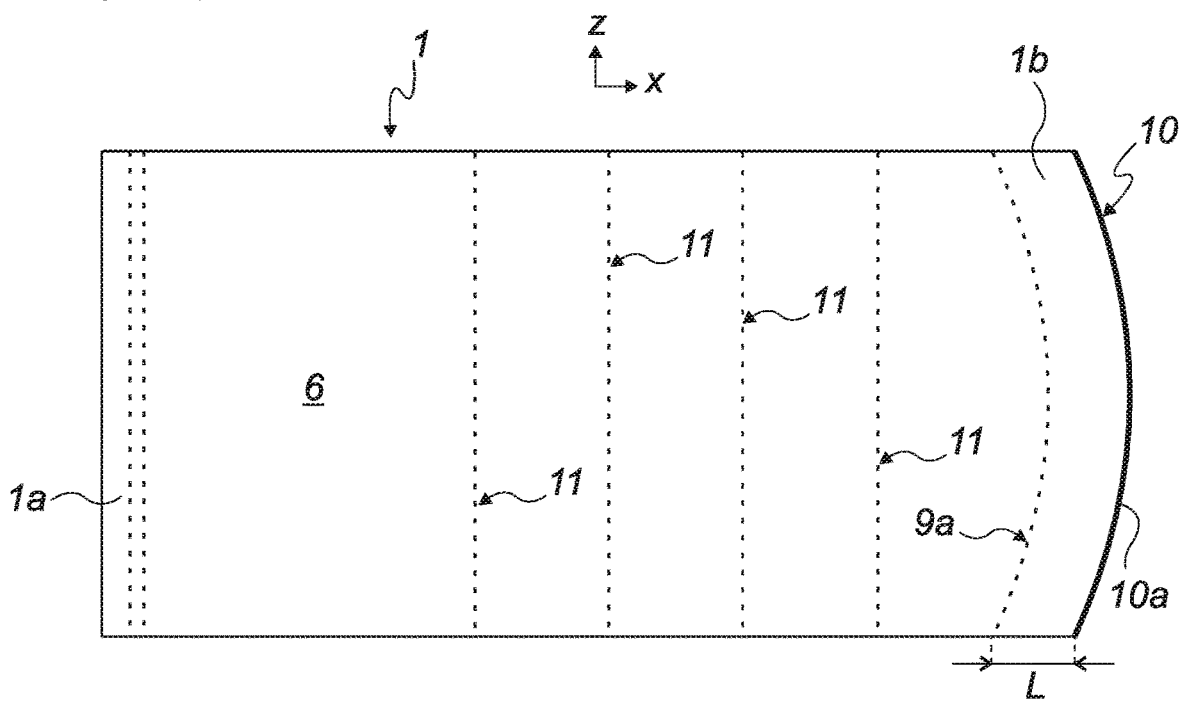
FIG. 2b is a top view of the optical guide of FIG. 2a, FIG. 3 is a perspective view of the optical guide of FIG. 2a or 2b, FIGS. 4a, 4b and 4c schematically show examples of propagations of beams of light in a first example embodiment of an optical guide, respectively in a plane yx, zx and zy, FIGS. 5a, 5b and 5c schematically show, in a plane zx, examples of propagations of beams of light in an optical guide, from different point sources, FIG. 6 schematically shows, with an enlargement of FIG. 2a, the minimum and maximum incidence angles of a beam of light propagating in an optical guide, FIGS. 7, 8 and 9 schematically illustrate three embodiments of an optical system each including an example embodiment of a specific light injection system.

FIG. 2a shows an example embodiment, in longitudinal profile view, of the optical guide 1. FIG. 2a is a view in a plane xy of a space xyz and FIG. 2b is an illustration in top view of said optical guide 1 in a plane zx.

The optical guide 1 comprises a first guide element 6 arranged above a second guide element 7. The guide elements 6 and 7 advantageously have a single-piece lamellar form and their respective faces across from one another are not contiguous over a portion of their length. A thin space 9 between the guide elements 6 and 7 thus makes it possible to produce an interface with a fine layer of air.

The guide elements 6 and 7 are connected to one another over a complementary portion 1b of their length L via a material continuity so as to establish a single-piece or monobloc form of the optical guide 1.

The optical guide 1 also includes an optical reflection member at one of its longitudinal ends. The latter is for example a cylindrical mirror 10a.

The cylindrical member 10a thus produces, with the complementary portion L, the optical coupling between the first guide element 6 and the second guide element 7. The beams of light thus propagate first in the first guide element 6 before propagating in the second guide element 7 in an opposite direction. However, in no case do part of the rays of light propagate simultaneously in both guide elements 6 and 7 and in the same propagation direction. The beams of light traversing the complementary portion 1b and reflecting on an inner face of the cylindrical mirror 10a therefore remain confined in the component material of the guide elements 6 and 7 and do not traverse any interface or material discontinuity.

The guide element 6 includes, at its longitudinal end opposite that including the cylindrical mirror 10, the input zone 1a. The latter is for example made by a single inclined face extending orthogonally to the plane xy.

The guide element 7 is also integrated into an extraction zone, for example including an extraction mirror 11. According to the example embodiment illustrated in FIG. 2b, the extraction zone includes a cascade of three semi-reflective extraction mirrors 11, making it possible to orient the beams of light toward the eye 2.

The space 9, extending up to a boundary corresponding to the inner edge 9a of the material continuity zone of the guide elements 6 and 7, advantageously has a sufficient thickness e to avoid direct optical coupling between said guide elements 6 and 7. The propagation of the light therefore occurs independently in each guide element 6 and 7. The thickness e of the space 9 is, however, sufficient to prevent reflected beams of light from penetrating said space 9, and thus to avoid signal losses.

The thickness e must therefore be as small as possible while avoiding the appearance of optical coupling between the guide elements 6 and 7. The thickness is advantageously comprised between 0.1 mm and 0.2 mm.

This end of the optical guide 1, illustrated for example in FIG. 2b, shows the arrangement of the cylindrical mirror 10a, with its inner face in contact with the shared longitudinal end of the guide elements 6 and 7.

Figure 3:
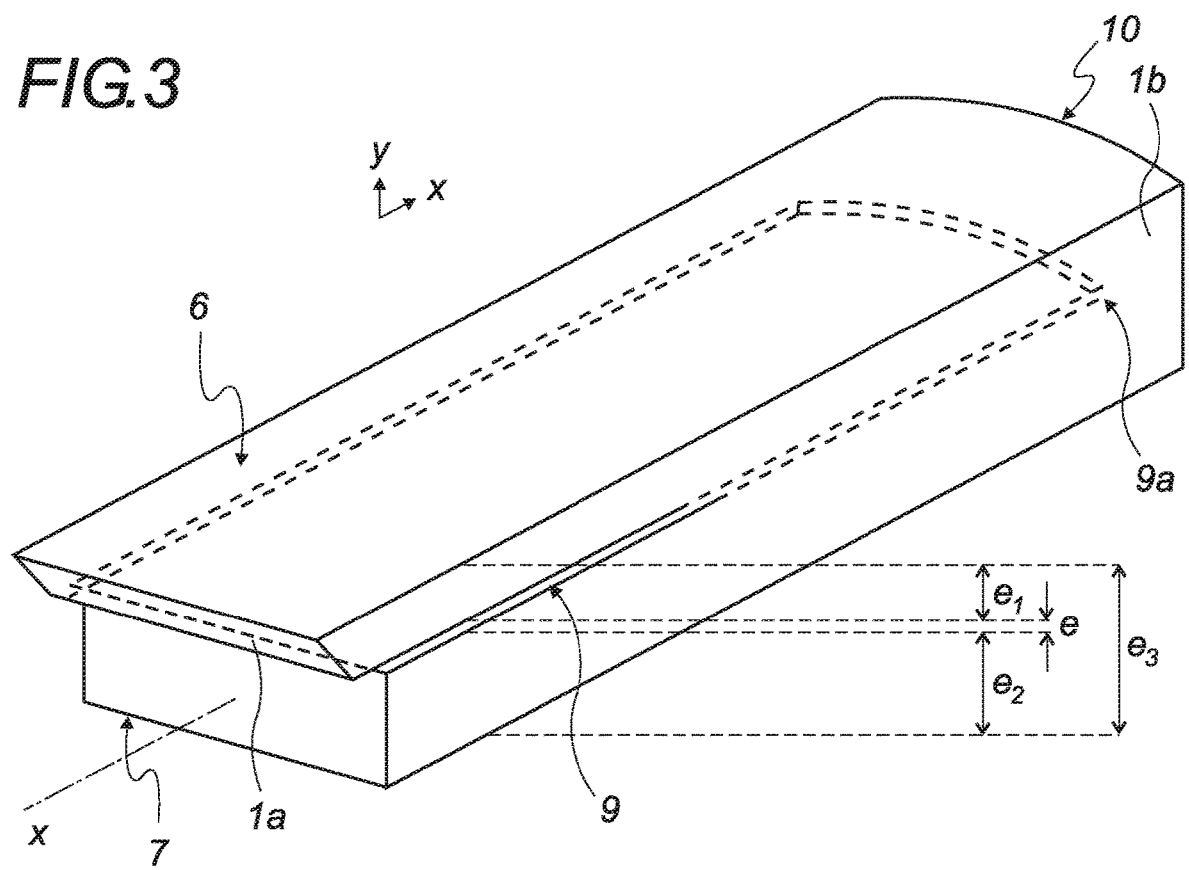

FIG. 3 is a perspective view of the optical guide of FIG. 2a or 2b.

The guide elements 6 and 7 advantageously have a lamellar shape, with substantially the same length and same width.

According to one preferred example embodiment, the thickness e2 of the second guide element 7 is substantially equal to twice the thickness e1 of the first guide element 6.

FIGS. 4a, 4b and 4c schematically show examples of propagations of beams of light in the optical guide 1, respectively in a plane yx, zx and zy.

Figure 5A:
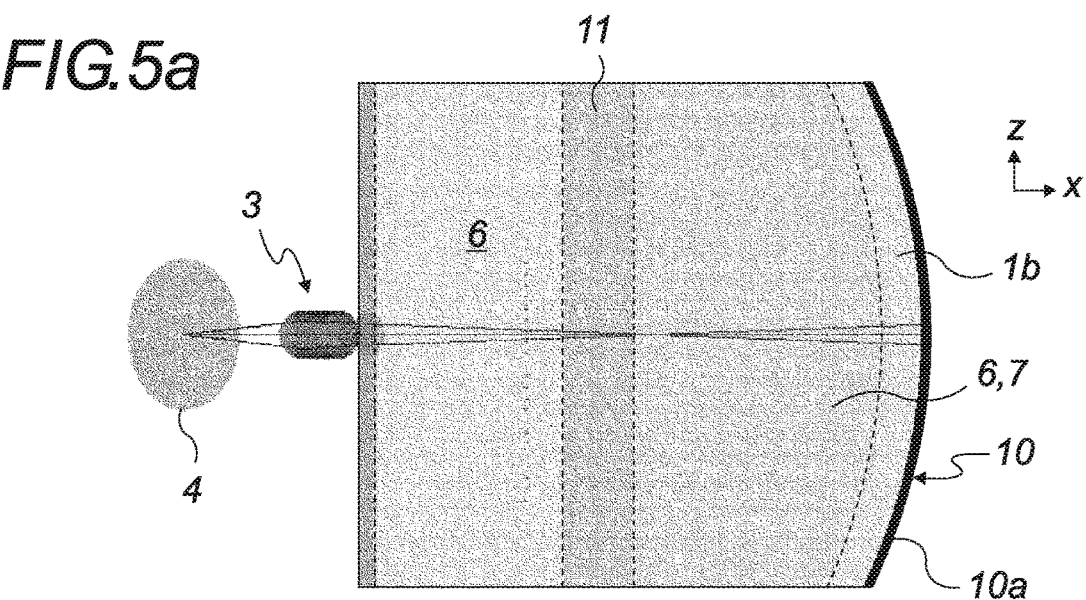
Figure 5B:
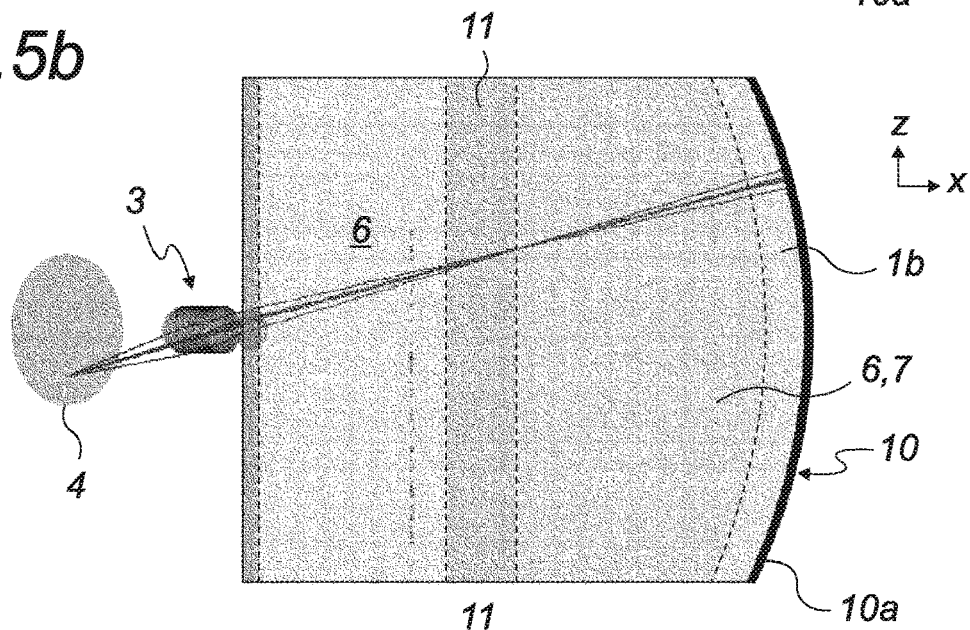
Figure 5C:
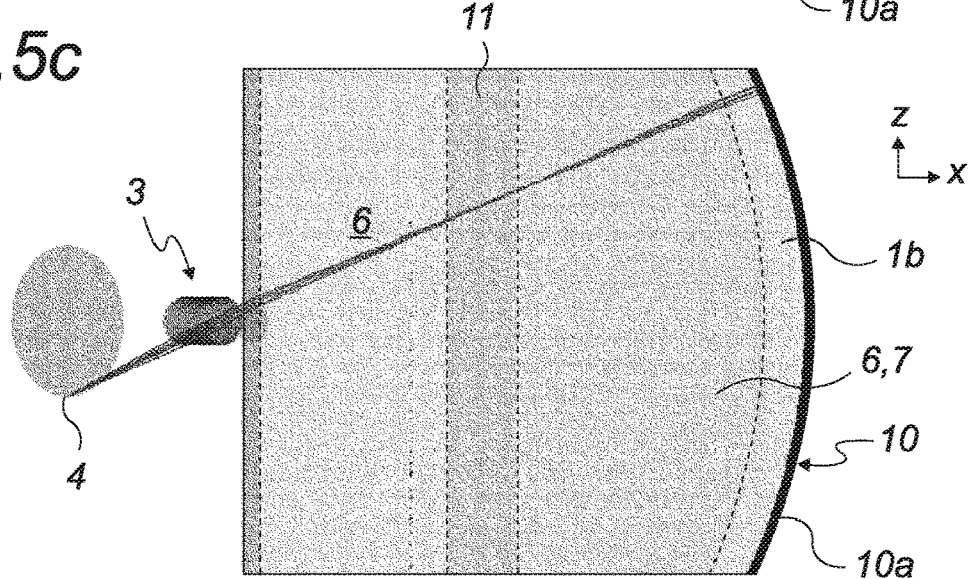

FIGS. 5a, 5b and 5c schematically show, in a plane zx, examples of propagations of beams of light in the optical guide 1, from different point sources located on the micro-display 4 associated with an inclined planar mirror 4a. FIG. 5a illustrates a beam of light extending substantially along the central axis x. FIG. 5b illustrates a beam of light extending in an intermediate direction, and FIG. 5c illustrates a beam of light extending in an extreme direction.

The optical guide 1 is advantageously integrated into an optical near-eye display system, of the virtual or augmented reality headset or glasses type.

Such an optical near-eye display system comprises, in addition to the optical guide 1 described above, the light injection system 3 for injecting light into said optical guide 1. The injection system 3 includes the micro-display 4 for providing point sources. The injection system 3 makes it possible to obtain, in the guide 1, beams of light that are parallel in a given direction y and convergent in the plane zx.

To that end, the injection system 3 includes optimized members, in particular of the lens type, for focusing, in the plane zx, orthogonal to the plane yx, each beam of light on a curved, approximately spherical focal surface. This focal surface is located at the focal distance from the cylindrical member 10 for the central beam of light or close to this focal distance for the other beams. The optimization is for example obtained by the arrangement of lenses and the machining of particular shapes of the free-form optical surface type. This makes it possible to ensure that the beams of light leaving the guide element 7 are completely parallel in the form of planar waves.

The axis z therefore corresponds to the vertical direction along which the field of view is substantially enlarged.

Figure 6:
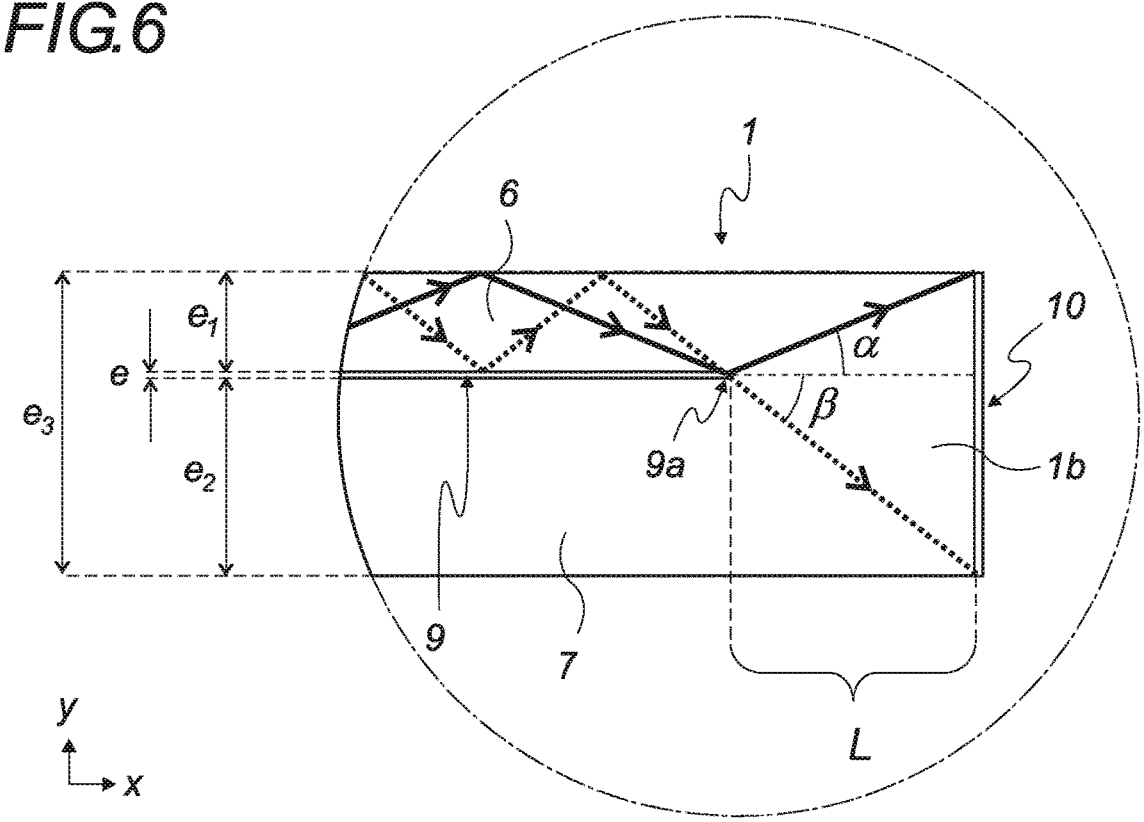

FIG. 6 schematically shows, with an enlargement of FIG. 2a, the minimum $\alpha$ and maximum $\beta$ incidence angles of a beam of light propagating in an optical guide 1. It is thus possible to determine the length L of the shared end portion 1b of the guide elements 6 and 7, in particular based on the thicknesses e1 and e2, respectively, of the guide elements 6 and 7. It is thus possible to calculate the minimum values of the length L, as well as the thickness e2 of the second guide element 7, starting from a thickness e1 of the first guide element 6.

The calculation elements, given below, assume that the component material of the guide elements 6 and 7, and consequently of the entire optical guide 1 excluding the cylindrical mirror 10a, is the same. For a given material, the value of the length L of the portion extending between the inner edge 9a and the mirror 10 is given by:

$$L = e1/\tan\alpha$$

The value of the length L therefore depends on the minimum incidence angle $\alpha$. The following relationship is also used:

$$e2 = L \times \tan\beta$$

This condition determines the thickness e2 of the second guide element 7 as a function of the length L and the maximum incidence angle $\beta$. As a result:

$$e2 = (\tan\beta/\tan\alpha) \times e1$$

One thus obtains the thickness e2 of the second guide element 7 as a function of the thickness e1 of the first guide element 6.

Thus as an example, with e1=1.5 mm, a minimum incidence angle α equal to 28° and an incidence angle β equal to 48°, one obtains a thickness of the second guide element 7 of e2=2.08×e1, therefore approximately 3 mm, and the length L equal to 2.82 mm, for example for the PMMA material.

According to one example embodiment of the optical guide 1, the first guide element 6 and the second guide element 7 have a length comprised between 40 mm and 50 mm, the width of said guide elements 6 and 7 being identical and comprised between 35 mm and 45 mm. These dimensions are for example particularly indicated for integration into glasses.

According to one preferred example embodiment, the optical guide has a thickness e3 comprised between 4 mm and 7 mm.

Figure 7:
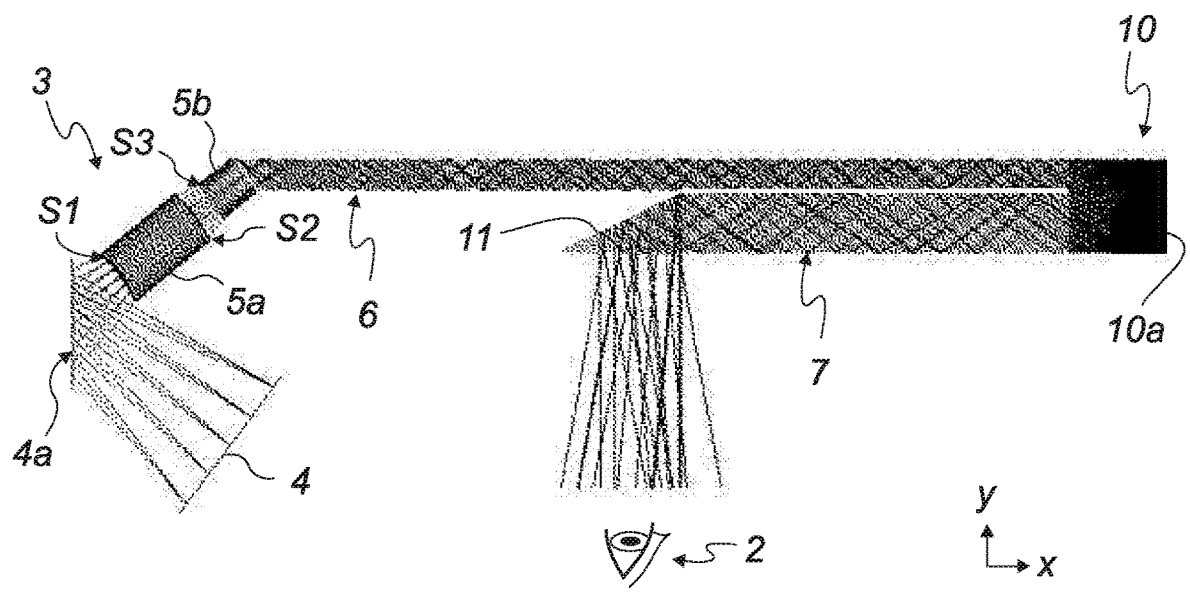

FIG. 7 schematically illustrates an embodiment of an optical system in which the light injection system 3 includes two lenses 5a, 5b. The latter advantageously have three free-form optical surfaces S1, S2, S3 associated with an inclined planar mirror 4a.

Figure 8:
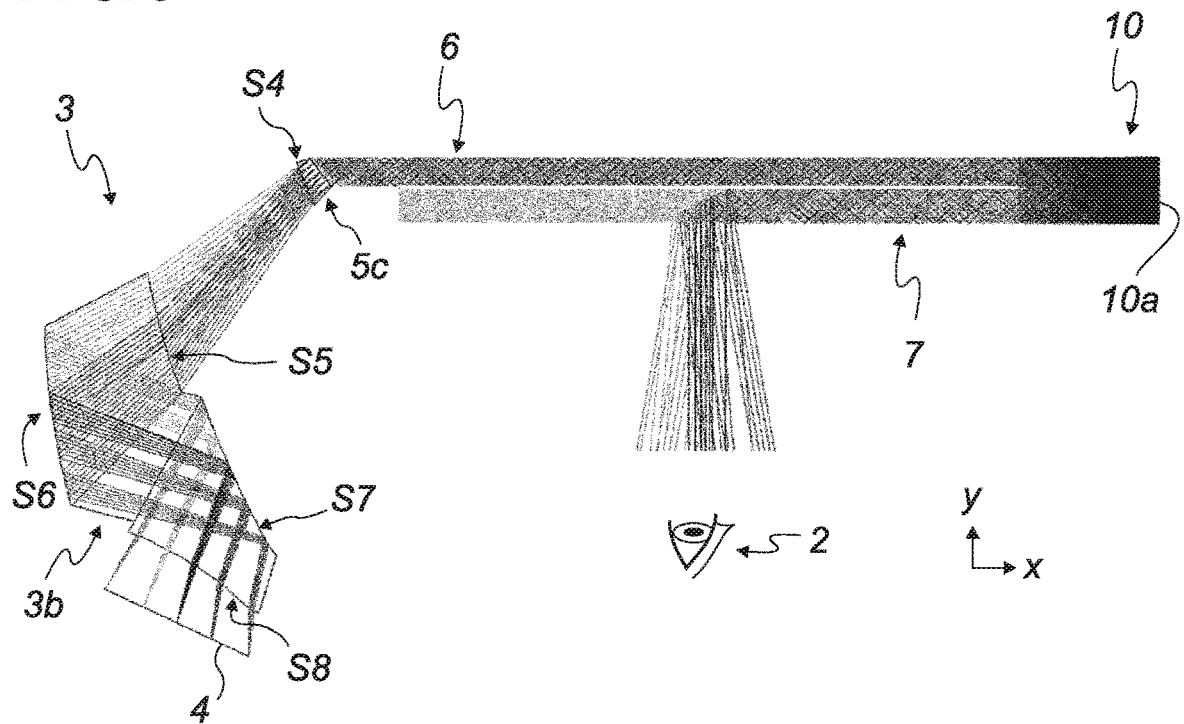

FIG. 8 schematically illustrates an embodiment of an optical system in which the light injection system 3 comprises a one-piece free-form prism 3b. The one-piece free-form prism 3b on the one hand has four free-form optical surfaces S5, S6, S7, S8, two of which S5, S8 work in transmission, while the other two S7, S6 work in reflection, and a lens 5c having a free-form optical surface S4.

In one example embodiment illustrated in FIG. 9, the light injection system 3 comprises two free-form mirrors S9 and S10 and one lens 5d having a free-form optical surface and a spherical lens 5e. The latter has one or two spherical faces. Advantageously, the spherical lens 5e has a planar face making it easier to position relative to the optical guide 1.

The lenses 5d and 5e are manufactured using different materials. One of the materials is for example optical glass, and the other material is for example a plastic or polymer. One thus obtains two free-form surfaces working in reflection, at least one free-form surface working in transmission and one spherical surface working in transmission.

In one example embodiment, the lens 5d has a free-form surface and a spherical face that is contiguous with the spherical face of the spherical lens 5e. The latter then has a second planar face.

In another example embodiment, the lenses 5d and 5e are not contiguous. The lens 5d then has free-form faces and the spherical lens 5e has a spherical face and a planar face.

Figure 10:
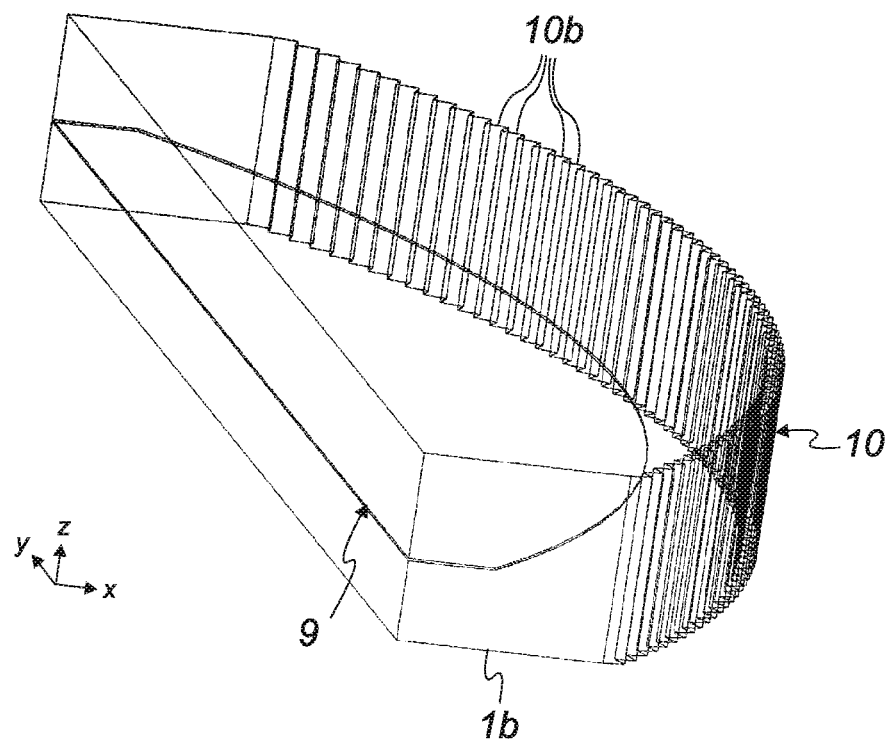
FIG. 10 is a partial illustration of another example embodiment of an optical guide.

FIG. 10 is a partial illustration of another example embodiment of an optical guide 1, used in another optical system. This optical system comprises a light injection system 3 in which the cylindrical mirror 10a is replaced by micro-reflectors in the form of saw teeth 10b. The latter, illustrated in more detail in FIG. 11, advantageously have a height h comprised between 0.2 mm and 1 mm and are distributed in a cylindrical arrangement with a radius of 42.8 mm. Two consecutive faces forming such a saw tooth advantageously have a mutual angle comprised between 89.8° and 90.2°, and preferably equal to 90°.

The optical reflection member is therefore made up of micro-reflectors 10b arranged with a cylindrical profile at the free end of the portion 1b. The micro-reflectors 10b in saw tooth form are advantageously metallized and made in the cylindrical free end of the portion 1b, either by molding or by machining.

Figure 11:
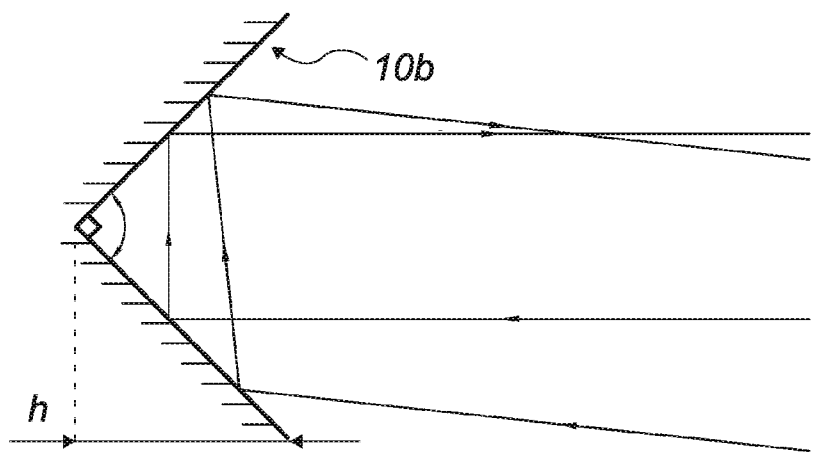
FIG. 11 shows an enlarged detail of FIG. 10, FIGS. 12 and 13 schematically illustrate two other embodiments of an optical system each including another example embodiment of a light injection system and an optical guide of FIG. 10, FIGS. 14a, 14b and 14c schematically show, in a plane zx, examples of propagations of beams of light in an optical guide and illustrated in FIG. 10.

With this configuration of the optical reflection member diagrammed in FIGS. 10 and 11, the optical system comprises a light injection system 3 for example shown in FIG. 12 or 13.

In the example embodiment illustrated in FIG. 12, the light injection system 3, which comprises the micro-display 4 to provide point light sources, also comprises three aspherical lenses 5f, 5g, 5i, arranged to have six aspherical optical surfaces and a spherical lens 5h that has at least one spherical surface.

The aspherical lenses 5f, 5g, 5i and the spherical lens 5h have a symmetry of revolution and are made, for at least one of them with a component material different from that of the others.

In the example embodiment illustrated in FIG. 13, the light injection system 3, which comprises the micro-display 4 to provide point light sources, also comprises eight spherical lenses 5j, 5k, 5l, 5m, 5n, 5o, 5p, 5q.

The spherical lenses 5j, 5k, 5l, 5m, 5n, 5o, 5p, 5q therefore have a symmetry of revolution, are advantageously made from optical glasses or a combination of optical glasses and plastics/polymers so as to produce an assembly whereof at least one lens is made with a component material different from that of the other lenses.

Figure 14A:
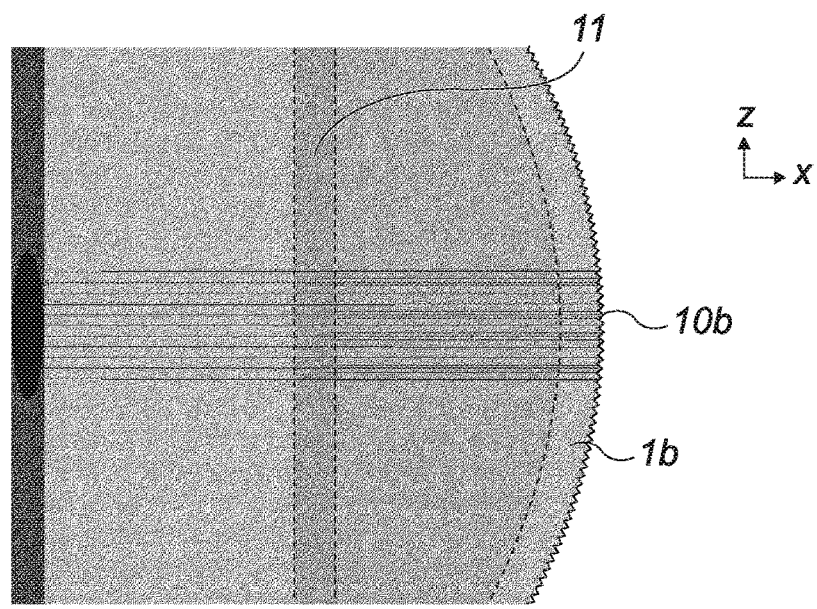
Figure 14B:
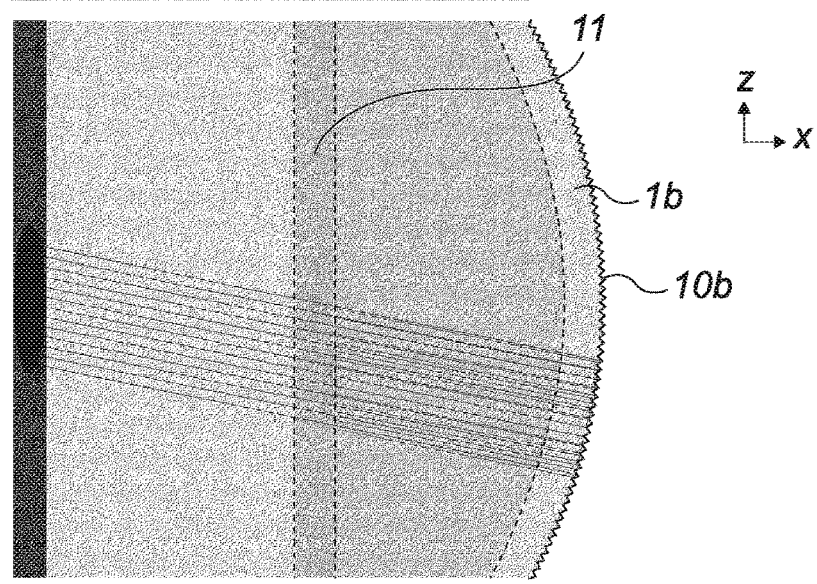
Figure 14C:
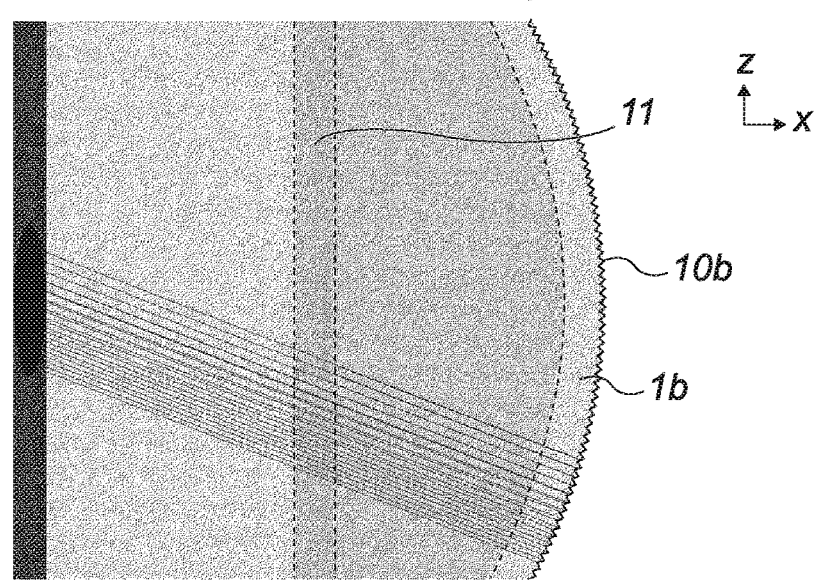

FIGS. 14a, 14b and 14c schematically show, in a plane zx, examples of propagations of beams of light in the form of planar waves in an optical guide 1 and in particular illustrated in FIGS. 10, 12 and 13.

Figure 15:
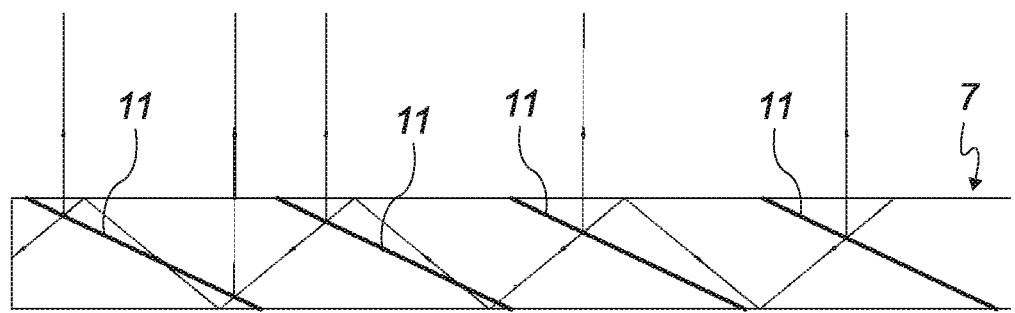
FIG. 15 is an illustration of an enlargement of an example light extraction system or guide arranged in an optical guide.

FIG. 15 is an illustration of an enlargement of a light extraction system or guide arranged in an optical guide 1. The extraction guide is advantageously made up of a series of semi-reflective mirrors 11.

The contemplated embodiments are of course not limited to the preferred embodiments previously described and illustrated in the various figures, one skilled in the art being able to make any modifications thereto and to conceive of other alternatives without going beyond the scope or framework of the inventions recited by the claims.

The invention claimed is:

1. An optical guide for a near-eye display device comprising:
   a singular first guide element having an associated singular input zone configured to receive an injected polychromatic beam of light,
   a second guide element having an output zone from which the injected polychromatic beam of light is extracted, the first guide element being superimposed on said second guide element, and
   an optical coupling system between the first guide element and the second guide element,
   wherein:
   the first and second guide elements have, over a first part of their length, a mutual spacing so as to delimit a fine layer of air between said guide elements extending between a first longitudinal end of the guide elements and the optical coupling system,
   the optical coupling system, located at a second longitudinal end of the first and second guide elements, comprising a single-piece portion of said guide elements, associated with a cylindrical optical reflection member for propagating the beams of light from the input zone toward the output zone, wherein the cylindrical optical reflection member is configured so the beam of light reflects off the cylindrical optical reflection member as a planar wave, and wherein a curvature of a surface of the cylindrical optical reflection member lies on a plane axes of the light guide.

2. An optical guide for a near-eye display device comprising:
a first guide element having an input zone to receive an injected beam of light,
a second guide element having an output zone from which the injected beam of light is extracted, the first guide element being superimposed on said second guide element, and
an optical coupling system between the first guide element and the second guide element,
wherein:
the first and second guide elements have, over a first part of their length, a mutual spacing so as to delimit a fine layer of air between said guide elements extending between a first longitudinal end of the guide elements and the optical coupling system,
the optical coupling system, located at a second longitudinal end of the first and second guide elements, comprising a single-piece portion of said guide elements, associated with a cylindrical optical reflection member for propagating the beams of light from the input zone toward the output zone, wherein the cylindrical optical reflection member is configured so the beam of light reflects off the cylindrical optical reflection member as a planar wave, and wherein a curvature of a surface of the cylindrical optical reflection member lies on a plane axes of the light guide.

3. The optical guide according to claim 2, wherein the spacing between the guide elements has a thickness e comprised between 0.1 mm and 0.2 mm, and wherein the second guide element has a thickness e2 linked to the thickness e1 of the first guide element by the relationship: e2=e1×(tanβ/tanα), with α and β respectively the minimum and maximum incidences of the beams of light injected into the first guide element.

4. The optical guide according to claim 2, wherein the spacing between the guide elements has a thickness e comprised between 0.1 mm and 0.2 mm.

5. The optical guide according to claim 2, wherein the first guide element has the input zone at a first free longitudinal end of the first guide element, in the form of an inclined face.

6. The optical guide according to claim 2, wherein the output zone is provided with a light extraction system including at least one extraction mirror.

7. The optical guide according to claim 2, wherein the output zone is provided with a light extraction system including a series of several semi-reflective extraction mirrors, making up an extraction guide.

8. The optical guide according to claim 2, wherein the second guide element has a thickness e2 linked to the thickness e1 of the first guide element by the relationship:
e2=e1×(tanβ/tanα), with α and β respectively the minimum and maximum incidences of the beams of light injected into the first guide element.

9. The optical guide according to claim 2, wherein the first guide element and the second guide element have a length comprised between 40 mm and 50 mm, the width of said guide elements being identical and comprised between 35 mm and 45 mm.

10. The optical guide according to claim 2, wherein the optical guide has a thickness e3 comprised between 4 mm and 7 mm.

11. The optical guide according to claim 2, wherein the guide elements are made with the same component material, of the PMMA type.

12. The optical guide according to claim 2, wherein the optical reflection member is a cylindrical mirror covering a cylindrical end surface of the portion.

13. The optical guide according to claim 2, wherein the optical reflection member is made up of micro-reflectors arranged with a cylindrical profile at a free end of the portion.

14. The optical guide according to claim 13, wherein the micro-reflectors are in metallized sawtooth form, which are made in the cylindrical free end of the portion.

* * * * *